US005285126A

United States Patent [19]

Hoffmann et al.

[11] Patent Number: 5,285,126

[45] Date of Patent: Feb. 8, 1994

[54] COLLECTOR SHOE AND METHOD FOR PRODUCING IT

[75] Inventors: Peter Hoffmann, Steeg; Johann Hoell, Hallstatt, both of Austria

[73] Assignee: Hoffmann & Co. Elektrokohle KG, Steeg, Austria

[21] Appl. No.: 690,996

[22] PCT Filed: Dec. 20, 1989

[86] PCT No.: PCT/EP89/01579

§ 371 Date: Jun. 18, 1991

§ 102(e) Date: Jun. 18, 1991

[87] PCT Pub. No.: WO90/07211

PCT Pub. Date: Jun. 28, 1990

[30] Foreign Application Priority Data

Dec. 20, 1988 [DE] Fed. Rep. of Germany ... 8815801[U]

[51] Int. Cl.$^5$ ............ H02K 13/00

[52] U.S. Cl. ............ 310/249; 310/251; 310/253; 29/826; 29/879

[58] Field of Search ............ 310/248, 249, 251, 252, 310/253, 42; 29/597, 879, 826

[56] References Cited

U.S. PATENT DOCUMENTS

| | | | |
|---|---|---|---|
| 672,449 | 4/1901 | Markey | 310/248 |
| 701,369 | 6/1902 | Mills | 310/248 |
| 3,445,704 | 5/1969 | Rokaw et al. | 310/249 |
| 3,509,400 | 4/1970 | Conrath | 310/248 |

FOREIGN PATENT DOCUMENTS

| | | | |
|---|---|---|---|
| 2838144 | 3/1980 | Fed. Rep. of Germany . | |
| 8815801 | 4/1989 | Fed. Rep. of Germany . | |
| 2339263 | 8/1977 | France . | |
| 0071582 | 3/1991 | Japan | 310/248 |
| 0202135 | 8/1991 | Japan | 310/248 |
| 0272683 | 3/1951 | Switzerland | 310/248 |
| 0556465 | 10/1943 | United Kingdom . | |
| 1509469 | 5/1978 | United Kingdom | 310/249 |

*Primary Examiner*—R. Skudy

*Attorney, Agent, or Firm*—Townsend and Townsend, Khourie and Crew

[57] ABSTRACT

A press-molded collector shoe having a body made of a first carbon piece, and a layer disposed on a side thereof made of a second, less conductive carbon piece. The second piece covers only a portion of the side of the collector shoe. An electrical lead projects from a portion of the side which is not covered by the second piece. During the production of the collector shoe the surface layer is pre-pressed in a separate step and the first carbon piece into which the lead wire is imbedded and the second piece are then pressed together.

4 Claims, 1 Drawing Sheet

COLLECTOR SHOE AND METHOD FOR PRODUCING IT

BACKGROUND OF THE INVENTION

The invention relates to a collector shoe comprising a press-molded main body made of a first carbon material, a layer disposed on a side surface of the main body which is made of a second, less conductive carbon material, and at least one electrical lead imbedded in the collector shoe.

Collector shoes of this type are generally constructed in a single pressing step, in which corresponding layers of the first and second carbon materials in powder form are initially placed in a press mold. The materials are then pressed together with a press die to form a finished collector shoe with an imbedded surface layer. At the same time the press die forces one end of the electric lead into the mass that is being compressed to thereby firmly imbed it therein. In some instances it is necessary that the lead extends from the side of the collector shoe which is covered by the layer of less conductive carbon material. When a collector shoe of this type is produced in the above described conventional manner, the end of the electrical lead must penetrate the surface layer to reach the main body. In so doing it is inevitable that the electrical lead carries some of the second, less conductive carbon material into the first carbon material. This means that some of the second material lodges in an uncontrolled manner between the electric lead and the first carbon material, thereby adversely and in an uncontrolled manner affecting the electrical resistance between the lead and the collector shoe.

SUMMARY OF THE INVENTION

An object of the present invention is, therefore, to construct a collector shoe of the aforementioned kind in which the resistance between the electrical lead and the collector shoe is not affected by the second carbon material which forms the surface layer, especially when the lead projects from the collector shoe through the side with the surface layer.

In accordance with the present invention this objective is achieved by using a surface layer which only partially covers the side of the collector shoe and positioning the lead so that it extends through the uncovered portion of that side of the shoe.

When producing a collector shoe constructed according to the present invention, the second, less conductive carbon material cannot become lodged between the electrical lead and the first carbon material.

In a further preferred embodiment of the present invention the surface layer is a pre-pressed blank of the second carbon material which is permanently press-bonded to the main body, made of the first carbon material.

BRIEF DESCRIPTION OF THE DRAWING

An embodiment of the present invention is described with reference to the attached drawing in which.

DESCRIPTION OF THE PREFERRED EMBODIMENTS

Figure 1:
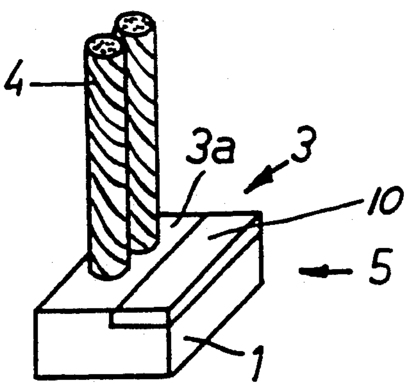
FIG. 1 shows a perspective view of a collector shoe made according to the present invention, and FIGS. 2 and 3 schematically represent the method of producing the collector shoe.

According to FIG. 1 a surface layer 10 is imbedded in a side 3 of a collector shoe 1 of, for example, rectilinear shape, and covers only a portion of the side covered by the surface layer, thereby leaving an area *3a* of the side exposed. Two electrical lead cables 4 are imbedded in and press molded with the collector shoe 1, and protrude from the exposed side. In use a narrow side 5 which is perpendicular to side 3 defines the surface of the collector shoe engaging the commutator ring.

Figure 2:
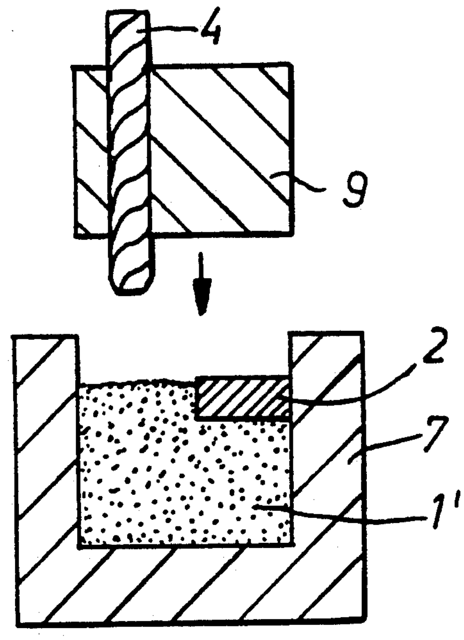
Figure 3:
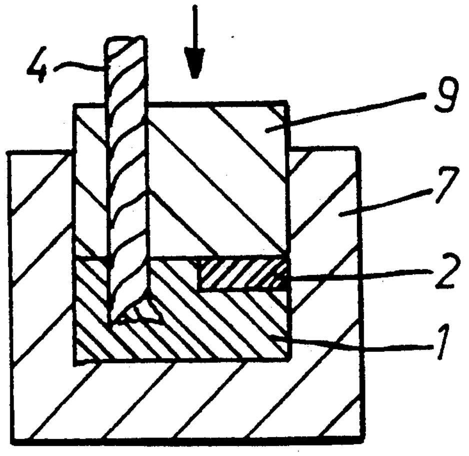

The collector shoe of the present invention is made as shown in FIG. 2 and 3 as follows: The surface layer 10, which is made of a carbon material of limited conductivity; e.g. of pure graphite, is preformed as a relatively flat, rectilinear prepressed blank 2 in a separate mold (not shown). Next, a mold 7 for the collector shoe is filled with the first, highly conductive carbon powder material 1', for example a mixture of graphite and metal powders. The pre-pressed blank is then placed on top of the powder material 1'. A press die 9 which includes openings for the electrical lead cables is then lowered. As the press die 9 moves downward the ends of electrical lead cables 4 and the prepressed blank 2 are pressed into the powder material 1', while in the same production step the powder material 1' and pre-pressed blank 2 are pressed together to thereby finish form the collector shoe 1 as a composite structure.

We claim:

1. A collector shoe comprising a main body having a plurality of transverse sides made by press-molding a first carbon powder material; at least one electrical lead embedded in said main body and extending over a portion of one of said sides; and a surface layer made of a second carbon material covering another portion of said one of said sides of the main body spaced from the portion of said one of said sides from which the lead extends; said surface layer being connected to the main body by press-bonding.

2. A collector shoe as claimed in claim 1, wherein said second carbon material has a lower conductivity than said first carbon material.

3. A method for making an electrical collector shoe comprising the steps of:

providing a press mold;

placing a first carbon material in powder form into the press mold;

positioning a pre-pressed blank of a second carbon material on said first carbon material in the press mold, so that the blank covers only a portion thereof;

inserting an end of at least one electrical lead into the first carbon material in the mold and locating the lead so that it is not covered by said blank; and forcing a press die against said blank and said first carbon material in the press mold to compress the first carbon material and thereby form a solidified main body having at least one lead embedded therein and simultaneously press-bond said blank to the main body.

4. A method as claimed in claim 1 wherein said inserting of the end of the lead into the first carbon material and said forcing are performed substantially simultaneously using a press die having an opening through which the electrical lead extends.

* * * * *